(12) United States Patent
Indarapu et al.

(10) Patent No.: US 10,592,921 B2
(45) Date of Patent: Mar. 17, 2020

(54) ADVERTISEMENT CONVERSION PREDICTION BASED ON UNLABELED DATA

(71) Applicant: Facebook, Inc., Menlo Park, CA (US)

(72) Inventors: Sameer Indarapu, Sunnyvale, CA (US); Pradheep K. Elango, Mountain View, CA (US); Xian Xu, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 985 days.

(21) Appl. No.: 15/091,105

(22) Filed: Apr. 5, 2016

(65) Prior Publication Data

US 2017/0286997 A1  Oct. 5, 2017

(51) Int. Cl.
*G06Q 30/00* (2012.01)
*G06Q 30/02* (2012.01)
*G06N 20/00* (2019.01)

(52) U.S. Cl.
CPC ......... *G06Q 30/0247* (2013.01); *G06N 20/00* (2019.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 2012/0323674 A1* | 12/2012 | Simmons | ............... | G06Q 30/02 705/14.41 |
| 2016/0086029 A1* | 3/2016 | Dubuque | ........... | G06K 9/00536 382/159 |
| 2016/0379244 A1* | 12/2016 | Kalish | ................ | G06Q 30/0242 705/14.41 |

* cited by examiner

*Primary Examiner* — Michael W Schmucker
(74) *Attorney, Agent, or Firm* — FisherBroyles, LLP

(57) ABSTRACT

Embodiments are disclosed for predicting target events occurrence for an advertisement campaign. A computing device according to some embodiments assigns a label to an advertisement as unlabeled, in response to a notification that a prerequisite event occurs for the advertisement. The device generates feature vectors based on data that relate to the advertisement. The device further trains a machine learning model using the feature vectors of the unlabeled advertisement based on a first term of an objective function, without waiting for a target event for the advertisement to occur. The first term depends on unlabeled advertisements. The device predicts a probability of a target event occurring for a new advertisement, by feeding data of the new advertisement to the trained machine learning model.

20 Claims, 7 Drawing Sheets

$$\text{Log-loss} = -\frac{1}{N}\sum_{i=1}^{N}\left[V_i^{-}\log(1-P_i)+V_i^{+}\log(P_i)\right] \qquad \underline{510}$$

$$= -\frac{1}{N}\sum_{i=1}^{N}\left[V_i^{pre}\log(1-P_i)-V_i^{+}\log(1-P_i)+V_i^{+}\log(P_i)\right]$$

$$= -\frac{1}{N}\sum_{i=1}^{N}\left[V_i^{pre}\log(1-P_i)+V_i^{+}\log(\frac{P_i}{1-P_i})\right] \qquad \underline{520}$$

Training: SGD (Log-loss)  $\underline{530}$

ADVERTISEMENT CONVERSION PREDICTION BASED ON UNLABELED DATA

BACKGROUND

Online advertising is a form of advertising where advertisers pay website operators or online content providers for placing online graphical or textual advertisements on the web pages. The markets for online advertising offer advertisers a broad range of payment options. For example, an advertiser may choose a cost-per-impression (CPM) option if the goal of the advertiser is to broadcast a message to the target audience. If the advertiser's goal is to lead the audience to a website or to take a predefined action, the advertiser may prefer a cost-per-click (CPC) or cost-per-conversion (CPA) option. The predefined action can be, e.g., making a purchase or subscribing an email list.

In order to efficiently estimate the cost of the advertisement campaign, a platform offering the CPC or CPA option needs to accurately determine the probability that the impression of the advertisement leads to a click or a conversion event. However, it is hard to predict whether a conversion will occur after an impression or a click event. While a click event often occur in a short time window after an impression of an advertisement, a conversion event can happen days or even week later. There is also a probability that a conversion event will never happen after the impression or the click event. These uncertainties make it difficult to predict the conversion probability in an accurate and efficient manner.

BRIEF DESCRIPTION OF THE DRAWINGS

FIG. 5 is an illustration of two alternative training algorithms used by the ML trainer for training the model.

DETAILED DESCRIPTION

The disclosed embodiments train a machine learning (ML) model to predict click-to-conversion ratio for online advertisements. There is a delay between the time point when the advertisement is shown, the time point when a user clicks the link of the advertisement and the time point when the conversion happens (e.g., purchase). Conventional ML model needs to wait for the data regarding the conversions before the ML model uses the feature vectors representing advertisements and the results for training. Meanwhile, online advertisements have short lifetimes and the ML model needs to enter production phase as soon as possible. If the ML model can only produce an accurate conversion prediction after a short lifetime of an online advertisement campaign, such a conversion prediction has little value.

The ML model according to the invention treats advertisements without conversion events (unlabeled) as having negative results by default. When there is a conversion event, the ML model makes the correction by feeding new training data with a feature vector representing the advertisement associated with a positive result. The ML model dynamically updates itself using the training data with new positive results in real time. Such an ML model does not need a time window to determine whether an advertisement eventually has a positive result.

Figure 1:
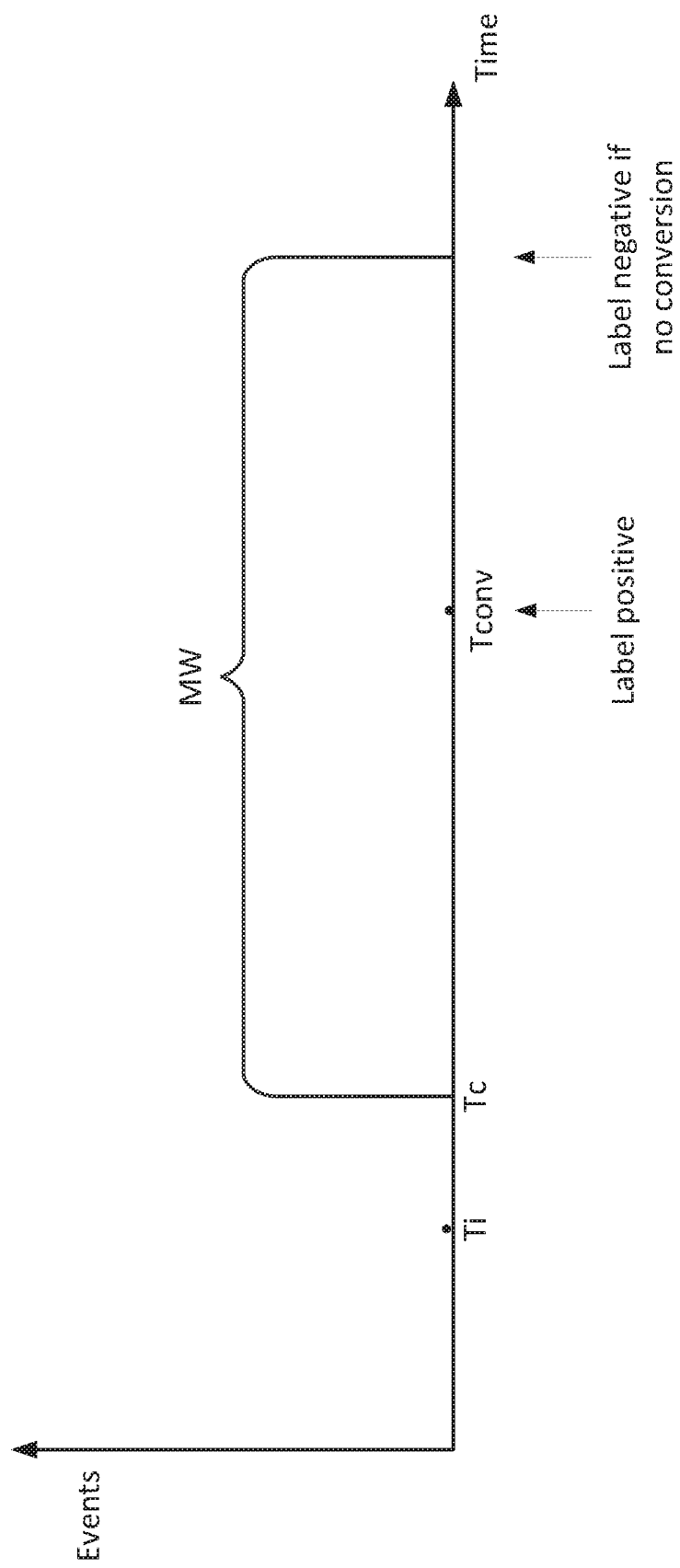
FIG. 1 is an illustration of a matching window for a machine learning model to determine conversion occurrence.

Because of the uncertainty of whether a conversion ever occurs after a click event, a conventional ML model uses a time period with a fixed time length, called matching window, for building a training set. FIG. 1 is an illustration of a matching window for a machine learning model to determine conversion occurrence. At a time point $T_i$, an impression event for an advertisement occurs. The impression event can be, e.g., the advertisement being displayed on a web page rendered by a web browser on a computer screen. At a subsequent time point $T_c$, a click event for the advertisement occurs. The click event can be, e.g., a user clicking on a web link of the advertisement displayed on the computer screen. Typically, the click event occurs in a relative short time window after the impression event (e.g., minutes).

The machine learning model decides a matching window (MW) after the click event for the purpose of deciding how to label the instance. If a conversion event occurs within the matching window at $T_{conv}$, the machine learning model labels the instance of the advertisement as positive, and feeds the training data to the machine learning model as positive training data. If the matching window passed but no conversion event ever occurs within the matching window, the machine learning model labels the instance of the advertisement as negative, and feeds the training data to the machine learning model as negative training data.

The determination of the time length of the matching window is based on multiple factors. If the length of the matching window is too short, there are too many instances that conversion events occur after the matching window and therefore those instances are incorrectly labeled as negative. On the other hand, the ML model needs to wait until the end of the matching window in order to determine the positive or negative label of the training data for that instance of the advertisement. If the length of the matching window is too long, such a ML model is stalled since it takes too long to train the ML model.

The matching window poses a problem, particularly when an advertising campaign has a short life. If it takes too long to determine the positive or negative labels of the instances of the advertisement, the ML model needs too much time (e.g. a long feedback loop) to feed the training data to itself and consequently the ML model cannot accurately determine the conversion probability within a reasonable time period. For advertisement campaigns having short lifetimes, such a stalled ML model is impracticable because the advertisement campaigns may end before the model produces any conversion prediction.

Figure 2:
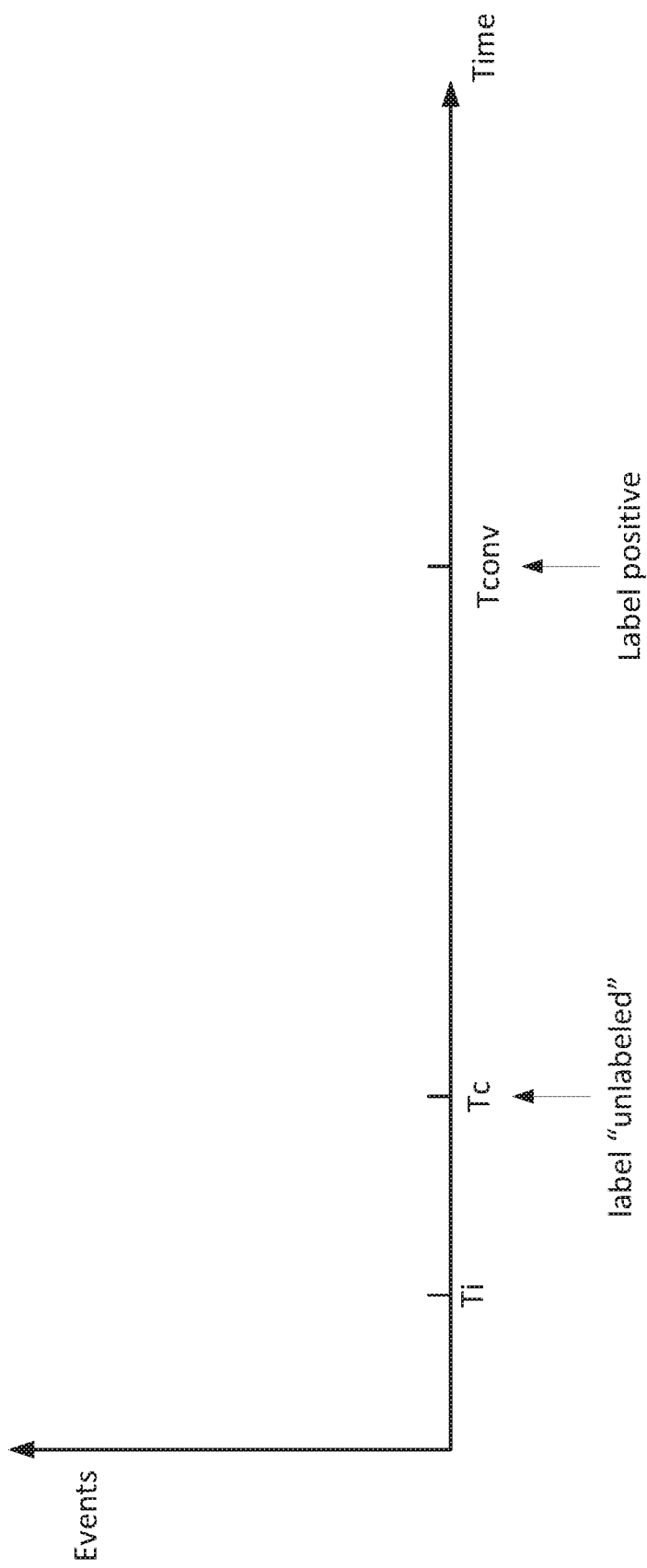
FIG. 2 is an illustration of a machine learning model determining conversion occurrence without a matching window.

At least some ML models according to the technology do not involve a matching window and thus can enter production mode to produce conversion prediction as early as possible. FIG. 2 is an illustration of a machine learning model determining conversion occurrence without a matching window. At a time point $T_i$, an impression event for an instance of an advertisement occurs. At a subsequent time point $T_c$, a click event for the advertisement occurs. Once the click event occurs, the ML model immediately labels the instance of the advertisement as unlabeled. The ML model does label the instance as negative for sure, because a conversion event may happen in the future. Nevertheless, the ML model can assume the unlabeled instance as a negative instance and immediately feeds the negative training data back to the ML model for training purpose.

If a conversion event occurs at a later time point $T_{conv}$, the ML model changes the label of the advertisement instance from unlabeled to positive and feeds the corrected positive training data again to the ML model. The ML model can start train itself in real time using the training data corresponding to that instance of the advertisement, as soon as a click event occurs. There is no need to wait for a fix time period of matching window before feeding the training data. The training process is dynamic since if a conversion occurs, the ML model updates the label as positive and trains itself again using the newly updated positive training data.

Figure 3:
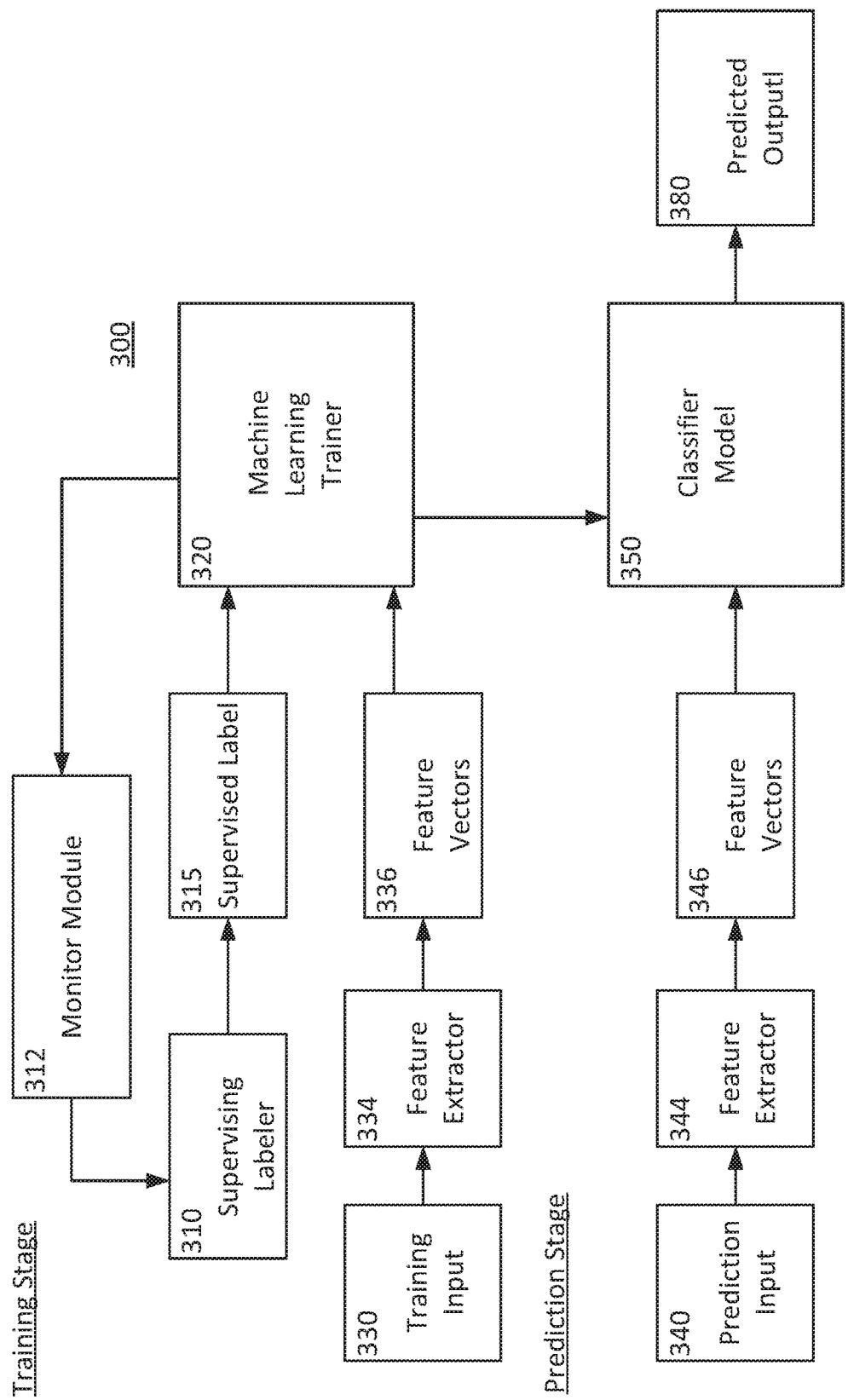
FIG. 3 is a block diagram illustrating a machine learning model that trains itself using the unlabeled training data.

FIG. 3 is a block diagram illustrating a machine learning model that trains itself using the unlabeled training data. At a training stage, the machine learning model 300 trains itself using the training data from each instance of an advertisement and/or a user profile of a user who incurs the impression and clicking of the instance of the advertisement. At a prediction stage, the machine learning model 300 receives data from an instance of an advertisement and/or a user profile as the input, and generates (e.g., via classification) a prediction output as to whether that instance of the advertisement will result in a conversion.

At the training stage, for an advertisement instance, a supervising labeler 310 of the machine learning model 300 initially labels that instance as unlabeled. As soon as a click event occurs for that advertisement instance, the supervising labeler 310 sends the supervised label 315 (e.g., unlabeled) to the machine learning trainer 320 of the machine learning model 300.

The feature extractor 334 receives the raw data of the advertisement instance and/or the user profile as training input 330. The feature extractor 334 converts the training input 330 into feature vectors 336. A feature vector can, e.g., an n-dimensional vector of numerical features that represent the advertisement instance and/or the user profile. The feature vectors 336 are sent to the machine learning trainer 320. Using the feature vectors 336 and the supervised label 315, the machine learning trainer 320 trains the classifier model 350.

A monitor module 312 of the machine learning model 300 continuously monitors that instance of the advertisement and updates the training of classifier model 350 if a conversion event eventually occurs for that advertisement instance. When the conversion event occurs, the monitor module 312 instructs the supervising labeler 310 to change the label of that advertisement instance from unlabeled to positive. The supervising labeler 310 then sends the updated supervised label 315 (positive) to the machine learning trainer 320. The machine learning trainer 320 again trains the classifier model 350 using the updated positive label 315 and the feature vectors 336.

In some embodiments, depending on whether supervised label 315 is positive or unlabeled, the machine learning trainer 320 trains the classifier model 350 using the feature vectors 336 in different ways. For example, the training algorithm of the machine learning trainer 320 can include two parts. The first part of the training algorithm depends on the values of unlabeled advertisements. The second part of the training algorithm depends on the values of positive advertisement. If the supervised label 315 is unlabeled, the machine learning trainer 320 trains the classifier model 350 using only the first part of the training algorithm. If the supervised label 315 is positive, the machine learning trainer 320 trains the classifier model 350 using only the second part of the training algorithm.

At the prediction stage, the feature extractor 344 at the prediction stage receives raw data of an instance of an advertisement and/or a user profile as prediction input 340. Similar to the training input 330, the prediction input 340 can include various types of information regarding the advertisement including, e.g., the type of text in the advertisement, the main color of the advertisement, the language of the advertisement, etc. The prediction input 340 can also include various types of information of the user profile for the user including, e.g., gender, age, location, language, etc.

In some embodiments, the feature extractor 344 at the prediction stage can be the same feature extractor as the feature extractor 334 at the training stage. Alternatively, the feature extractor 344 at the prediction stage can use different feature extraction algorithm comparing to the feature extractor 334 at the training stage. The feature extractor 344 converts the prediction input 340 into feature vectors 346. The feature vectors 346 are sent to the classifier model 350. Based on the feature vectors 346, the classifier model 350 automatically generates the predicted output 380. The predict output 380 is a prediction whether a conversion event occurs as a result of that instance of the advertisement.

Although the machine learning model 300 illustrated in FIG. 3 as a model for conversion prediction. The machine learning model 300 can produce prediction for any event that occurs after a prerequisite event. For example, in some embodiments, the classifier model is to predict the probability whether a click event of an advertisement instance will occur as a result of an impression event. For clicking prediction, the supervising labeler 310 initially labels an instance of an advertisement as unlabeled, as soon as an impression event occurs for that advertisement instance. The machine learning trainer 320 trains the classifier model 350 using the training data for the unlabeled advertisement instance. The monitor module 312 continues to monitor that advertisement instance. If a clicking event occurs, the supervising labeler 310 changes the label of the advertisement instance from unlabeled to positive. Then the machine learning trainer 320 again trains the classifier model 350 using the training data for the positive advertisement instance.

Figure 4:
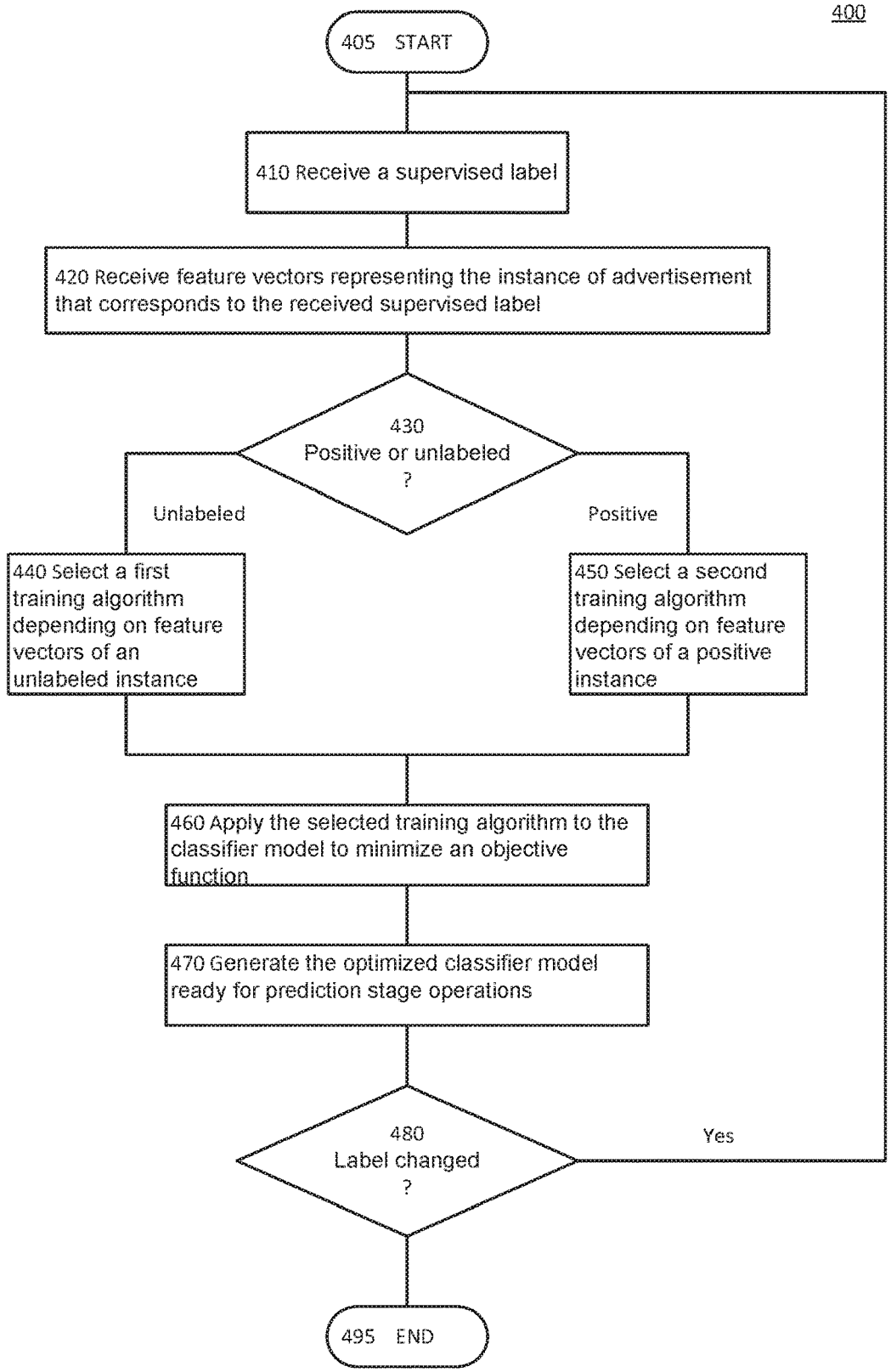
FIG. 4 is a block diagram illustrating a process of training a classifier model for predicting conversion probability based on supervised labels.

FIG. 4 is a block diagram illustrating a process of training a classifier model for predicting conversion probability based on supervised labels. At block 410 of the process 400, a machine learning (ML) trainer of a machine learning (ML) model (e.g. the machine learning trainer 320 as illustrated in FIG. 3) receives a supervised label. The supervised label can be, e.g., sent from the supervising labeler 310 as illustrated in FIG. 3. The supervised label can have a set of possible values. For example, in some embodiments, the supervised label can be either positive or unlabeled. In some other embodiments, the supervised label can be positive, negative, or unlabeled.

At block 420, the ML trainer further receives feature vectors representing the instance of advertisement that corresponds to the received supervised label. The feature vectors can be generated by, e.g., the feature extractor 334 as illustrated in FIG. 3.

At decision block 430, the ML trainer determines whether the supervised label is positive or unlabeled. If the label is "unlabeled," at block 440, the ML trainer selects a first training algorithm depending on feature vectors of an unlabeled instance. Unlabeled instances are advertisement instances where prerequisite events already occurred but no conversion events have occurred yet. In some embodiments, the prerequisite events for conversion events are clicking events.

If the label is positive, at block 450, the ML trainer selects a second training algorithm depending on feature vectors of a positive instance. Positive instances here are advertisement instances that result in conversion events.

At block 460, the ML trainer applies the selected training algorithm to the classifier model to minimize an objective function (e.g., a function measuring the accuracy of the classifier model). At block 470, the ML trainer generates the optimized classifier model ready for prediction stage operations. At decision block 480, the ML model continues to determine whether the supervised label is changed. If so, the process 400 proceeds to block 410 to receive a newly changed supervised label and update the classifier model again.

Although the process 400 is illustrated in FIG. 4 as a training process for conversion prediction. The model trained using the process 400 can produce prediction for any event that occurs after a prerequisite event. For example, in some embodiments, the classifier model can predict the probability whether an impression event of an advertisement instance will result in a click event. The process 400 illustrated in FIG. 4 can be applied to such a classifier model as well.

For predicting clicking probability, the positive instances for the first training algorithm at block 440 are advertisement instances that result in click events. The unlabeled instances are advertisement instances where prerequisite events already occurred but no click events have occurred yet. For predicting clicking probability, the prerequisite events for click events are impression events.

FIG. 5 is an illustration of two alternative training algorithms used by the ML trainer for training the model. In order to optimize the classifier model, an objective function is minimized during the optimization. The classifier model can be used to predict probability of click, conversion, or other events. The objective function can be, e.g., a function measuring the accuracy of the classifier model. For example, as illustrated in FIG. 5, the objective function can be a logarithmic loss (log-loss) function 510. The value of the logarithmic loss function 510 quantitatively represents an accuracy level of the classifier model for predicting whether a target event occurs. For conversion prediction, the target event is the conversion (e.g., purchase, subscription, etc.). For clicking prediction, the target event is the clicking of the advertised link.

In the log-loss function 510, N is the total number of advertisement instances available so far for training. For each advertisement instance i, $V_i^+$ is the numerical value representing the positive instances. The positive instances are advertisement instances that result in target events. For conversion prediction, the target event is the conversion and the prerequisite event is the clicking event. For clicking prediction, the target event is the clicking event and the prerequisite even is the impression event. $P_i$ is the probability that the target event occurs for the instance i, which is predicted by the current version of the classifier model 350. $V_i^-$ is the numerical value representing the negative instances that result in no target events. Again, for conversion prediction, the target event is the conversion event. $(1-P_i)$ is the probability that the target event never occurs for the instance i.

In some embodiments, for conversion prediction, an impression event can be a prerequisite event as well. For example, the log-loss function Since the log-loss function 510 depends on positive and negative instances, the ML trainer can use the log-loss function 510 as a training algorithm for training the classifier model if the positive and negative instances are certain. However, the ML trainer cannot be sure if an instance is positive or negative in real time because a target event (e.g., conversion event) can occur any time after the prerequisite event (e.g., click event).

Once a prerequisite event occurs for an advertisement instance, the instance will be either a positive instance where a target event eventually occurs or a negative instance where a target event never occurs. In other words, the total number of negative instances equals the total number of prerequisite events minus the total number of positive instances; $V_i^+ = V_i^{pre} - V_i^+$, where $V_i^{pre}$ is the numerical value representing the prerequisite events. For conversion prediction, the prerequisite events are clicking events.

Therefore, as shown in log-loss function 520, the log-loss function can be expressed as a combination of a first term relating to $V_i^{pre}$ and a second term relating to $V_i^+$. In other words, the log-loss function 520 includes two terms; the first term depends on prerequisite events and the second term depends on the positive instances. Therefore, if the supervised label is unlabeled, the ML trainer at block 440 of process 400 can use the first term of the log-loss function 520 as the first training algorithm for training the classifier model using the feature vectors of unlabeled instances. Unlabeled instances are advertisement instances where prerequisite events already occurred but no conversion events have occurred yet. Since the target event has not occurred yet, the prerequisite event term of the log-loss function can be updated for training purpose using the training data of an unlabeled instance.

If the supervised label for an advertisement instance is positive, the ML trainer at block 450 of process 400 can use the second term of the log-loss function 520 as the second training algorithm for training the classifier model using the feature vectors of the positive instance. Positive instances are advertisement instances where the target events (e.g., conversion events) have already occurred.

The log-loss function is an objective function measuring the accuracy of the classifier model. The less value of the log-loss function, the better accuracy has the classifier model. In order to optimize the classifier model, the ML trainer applies an optimization method for minimizing the log-loss function. For example, the optimization method can be a stochastic gradient descent (SGD) method to minimize the log-loss function. Thus, through the stochastic gradient descent process, the classifier model is trained by the training data of a prerequisite event under the first term of log-loss function 520 (if the supervised label is unlabeled), or by the training data of a positive instance under the second term of log-loss function 520 (if the supervised label is positive).

In some embodiments, the same log-loss function 520 and SGD 530 can also be used to train classifier model for click prediction instead of conversion prediction. For click prediction, the target event is the clicking event; while the prerequisite event is the impression event. Thus, $V_i^+$ is the numerical value representing positive instances where click events have already occurred. $V_i^+$ is the numerical value representing negative instances where click events never occur. $V_i^{pre}$ is the numerical value representing instances where impression events (prerequisite events) have occurred but clicking events have not occurred yet.

In some embodiments, for conversion prediction, an impression event can be a prerequisite event as well. In other words, the target event is the conversion event; the prerequisite event is the impression event. Thus, $V_i^+$ in log-loss function 520 is the numerical value representing positive instances where conversion events have already occurred. $V_i^{pre}$ is the numerical value representing instances where impression events (prerequisite events) have occurred but conversion events have not occurred yet.

In some embodiments, the log-loss function 520 can be used for a 2-step decomposition that considers conversion events, clicking events, as well as impression events. The 2-step decomposition with a probability of P(click|imp)*P(conv|click) can be orthogonal to the technology of decomposing into unlabeled and positive instances.

In some embodiments, the log-loss function 520 and SGD 530 can also be used to train classifier model for predicting target events that need multiple prerequisite events. For example, in some cases, the conversion events need multiple prerequisite events including impression events as well as click events. In those cases, $V_i^{pre}$ can be interpreted as the numerical value representing instances where all prerequisite events (including impression events and click events) have occurred but target events (conversion events) have not occurred yet.

The training data for each positive instance, negative instance, or prerequisite event can be identified by, e.g., an advertisement ID for identifying the corresponding instance of the advertisement. In some other embodiments, the training data can be identified by other IDs including, e.g., user ID, automatically generated sequence ID, or a combination of various IDs.

Beside conversion prediction and click prediction, the technology can be applied to predict any type of target events that occur after another type of prerequisite events (or multiple types of prerequisite events). There is a delay between the prerequisite event and the target event; but the time length of the delay is uncertain. For example, the prerequisite event can be a notification to a user for requesting the user to take a particular action; and the target event can be that the user actually takes the requested action. When the notification has been sent and the user has not taken the requested action, the ML classifier model can still be trained using the training data from that instance, based on the second term of the log-loss 520 that relates to the prerequisite event. Once the user takes the requested action, the ML classifier model can be further trained again, based on the first term of log-loss 520 that relate to the positive target event.

Figure 6:
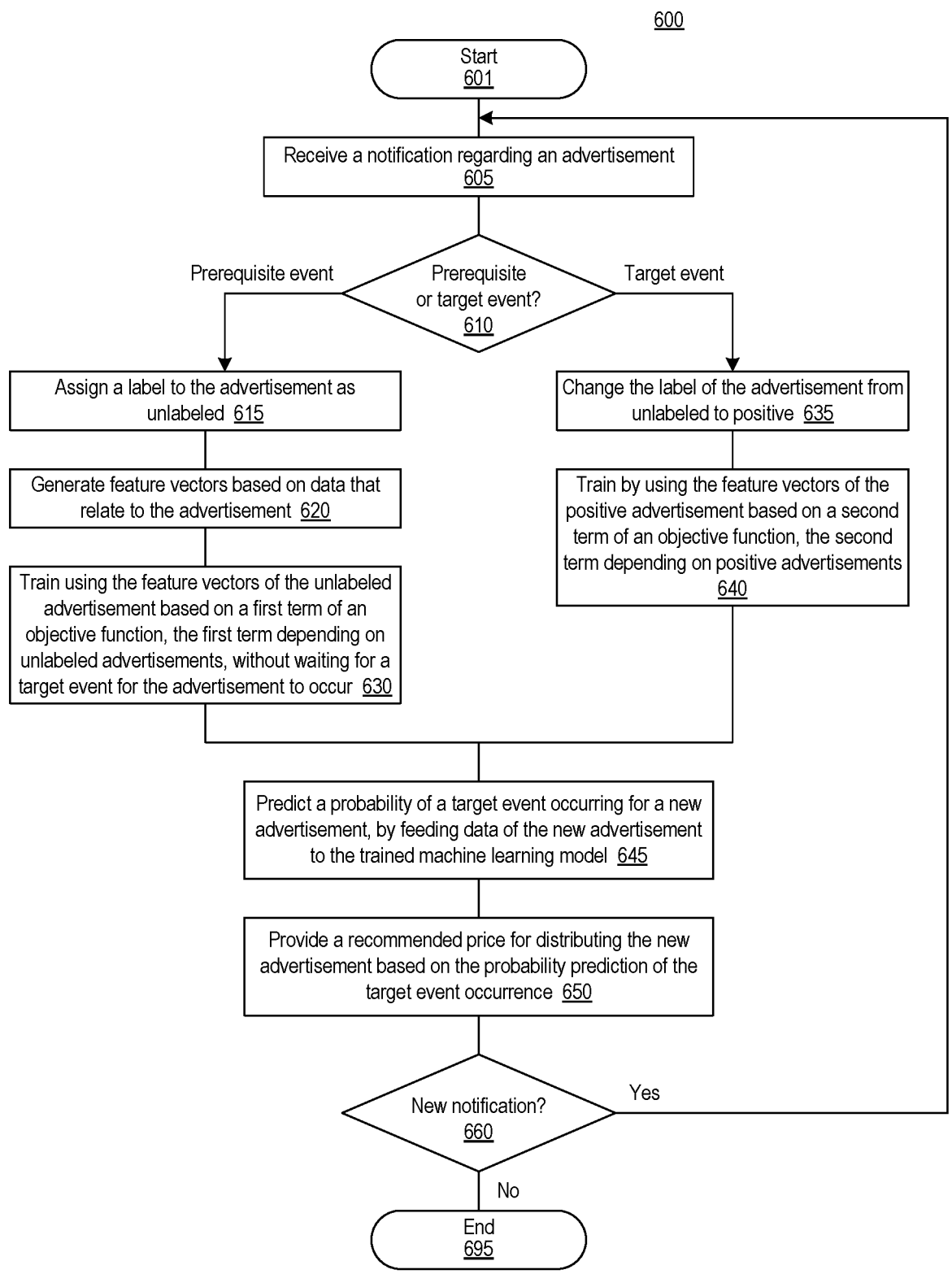
FIG. 6 is a block diagram illustrating a process of running a machine learning model for predicting target events occurrence as results of advertisements.

FIG. 6 is a block diagram illustrating a process of running a machine learning model for predicting target events occurrence as results of advertisements. The target events can be any events occurring after prerequisite events as results of the advertisements. For example, the target event can be a clicking event when a web link included in the advertisement is clicked; and the prerequisite event can be an impression event when the advertisement is rendered on a device screen for a user.

Alternatively, the target event can be a conversion event that relates to the advertisement; the prerequisite event can be a clicking event when a web link included in the advertisement is clicked. The conversion event can be an event of a purchase transaction or a subscription as a result of the advertisement.

At block 605 of the process 600, the machine learning model running on a computing device receives a notification regarding an advertisement. At decision block 610, the machine learning model determines whether the notification relates to an occurrence of a prerequisite event or a target event as a result of the advertisement. If the notification relates to occurrence of a prerequisite event, the process 600 proceeds to block 615. In response to the occurrence of the prerequisite event, at block 615, the machine learning model assigns a label to the advertisement as unlabeled.

At block 620, the machine learning model generates feature vectors based on data that relate to the advertisement. In some embodiments, the feature vectors can be generated based on the data that relate to the advertisement, as well as data of a user profile for a user who incurs the prerequisite event as a result of the advertisement.

At block 630, the machine learning model is trained using the feature vectors of the unlabeled advertisement based on a first term of an objective function, the first term depending on unlabeled advertisements, without waiting for a target event for the advertisement to occur. In some embodiments, the objective function is a logarithmic loss function including two terms (e.g., equation 520 in FIG. 5). The first term depends on numerical values representing positive advertisements of which target events have occurred. The second term depends on numerical values representing unlabeled advertisements of which prerequisite events have occurred but target events have not occurred. In some embodiments, the objective function includes no term depending on numerical values representing negative instances of the advertisement of which target events never occurred.

In some embodiments, the machine learning model is trained by adjusting parameters of the machine learning model to minimize the objective function through a stochastic gradient descent process.

If the notification at block 615 relates to occurrence of a target event, the process 600 proceeds to block 635. At block 635, in response to the occurrence of the target event, the machine learning model changes the label of the advertisement from unlabeled to positive.

At block 640, the machine learning model is further trained by using the feature vectors of the positive advertisement based on a second term of an objective function, the second term depending on positive advertisements. In some embodiments, such a dynamical training using the feature vectors of the positive advertisement is conducted in real time when the target event occurs for the advertisement. In some embodiments, the model continues to predict probabilities of target events occurring for advertisements when the machine learning model is trained dynamically.

At block 645, the machine learning model predicts a probability of a target event occurring for a new advertisement, by feeding data of the new advertisement to the trained machine learning model. In some embodiments, the model predicts the probability, without a delay of a predetermined time window. The time window is predetermined before the training process. If no target event occurs within the predetermined time window, the instance of the advertisement can be treated as negative advertisement of which the target event never occur as a result of the advertisement. In some embodiments, the model predicts the probability, before or within a lifetime of the advertisement campaign when instances of the advertisement are distributed.

At block 650, the machine learning model can further provide a recommended price for distributing the new advertisement based on the probability prediction of the target event occurrence. For example, in some embodiments, the target events can be conversion events. The recommended price can be used for advertising pricing based on a cost-per-conversion basis. In some other embodiments, the target events can be clicking events. The recommended price can be used for advertising pricing based on a cost-per-click basis.

At decision block 660, the machine learning model determines whether a new notification regarding events of advertisements is received. If so, the process 600 proceeds to block 610.

Figure 7:
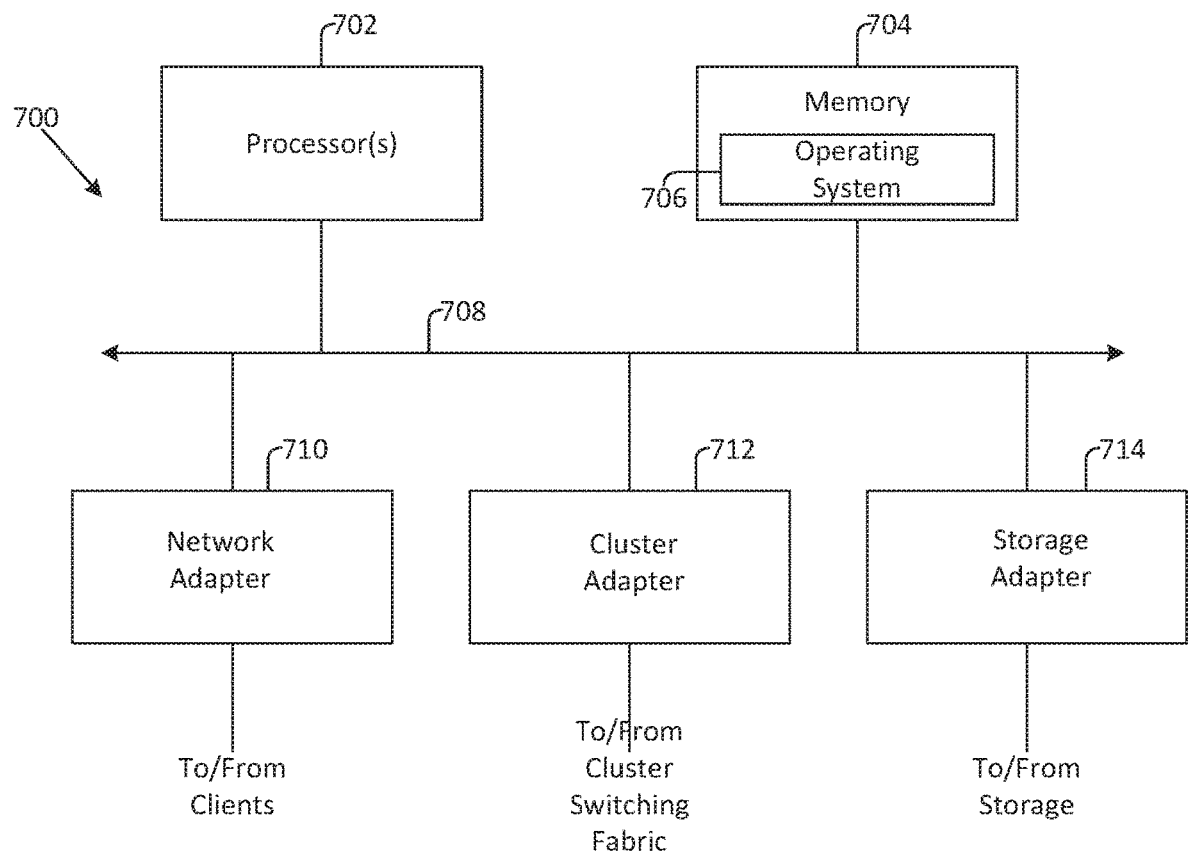
FIG. 7 is a high-level block diagram illustrating an example of a hardware architecture of a computing device that performs disclosed processes, in various embodiments.

FIG. 7 is a high-level block diagram illustrating an example of a hardware architecture of a computing device 700 that performs the above process, in various embodiments. The computing device 700 executes some or all of the processor executable process steps that are described below in detail. In various embodiments, the computing device 700 includes a processor subsystem that includes one or more processors 702. Processor 702 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 700 can further include a memory 704, a network adapter 710, a cluster access adapter 712 and a storage adapter 714, all interconnected by an interconnect 708. Interconnect 708 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 712 includes one or more ports adapted to couple the computing device 700 to other devices. In the illustrated embodiment, Ethernet can be used as the clustering protocol and interconnect media, although other types of protocols and interconnects may be utilized within the cluster architecture described herein.

The computing device 700 can be embodied as a single- or multi-processor system executing an operating system 706 that can implement a high-level module, e.g., a manager, to logically organize the information as a hierarchical structure of named directories, files and special types of files called virtual disks at the storage devices. The computing device 700 can further include graphical processing unit(s) for graphical processing tasks or processing non-graphical tasks in parallel.

The memory 704 can comprise storage locations that are addressable by the processor(s) 702 and adapters 710, 712, and 714 for storing processor executable code and data structures. The processor 702 and adapters 710, 712, and 714 may, in turn, comprise processing elements and/or logic circuitry configured to execute the software code and manipulate the data structures. The operating system 706, portions of which are typically resident in memory and executed by the processor(s) 702, functionally organizes the computing device 700 by (among other things) configuring the processor(s) 702 to invoke. It will be apparent to those skilled in the art that other processing and memory implementations, including various computer readable storage media, may be used for storing and executing program instructions pertaining to the technology.

The network adapter 710 can include multiple ports to couple the computing device 700 to one or more clients over point-to-point links, wide area networks, virtual private networks implemented over a public network (e.g., the Internet) or a shared local area network. The network adapter 710 thus can include the mechanical, electrical and signaling circuitry needed to connect the computing device 700 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 714 can cooperate with the operating system 706 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 714 can include multiple ports having input/output (I/O) interface circuitry that couples to the disks over an I/O interconnect arrangement, e.g., a conventional high-performance, Fibre Channel (FC) link topology. In various embodiments, the cluster adapter 712 and the storage adapter 714 can be implemented as one adapter configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method to estimate a cost of distributing a new advertisement based on instances of an advertisement campaign, comprising:
    assigning, by a computing device, instances of the advertisement campaign as unlabeled, in response to a notification that a prerequisite event has occurred;
    generating feature vectors based on the unlabeled instances;
    re-assigning each instance of a subset of the unlabeled instances as positive upon receiving a notification that a target event has occurred;
    training, by the computing device, a machine learning model using the feature vectors of the unlabeled instances by calculating a first term of a logarithmic loss objective function;
    training, by the computing device, the machine learning model with a second term of the objective function using the feature vectors of the instances of the subset;
    determining a probability of a target event occurring for a new advertisement by processing a feature vector generated from the new advertisement with the trained machine learning model; and applying the probability to estimate the cost of distributing the new advertisement.

2. The method of claim 1 further comprising: setting the first term of the objective function to zero.

3. The method of claim 1, wherein the prerequisite event comprises a click event when a web link included in the instance of the advertisement is clicked, and the target event comprises a conversion event related to the click event.

4. The method of claim 3, wherein the conversion event comprises at least one of a purchase or a subscription.

5. The method of claim 1, wherein the prerequisite event comprises an impression event when the advertisement is rendered on a device screen for a user, and the target event comprises a click event when a web link included in the advertisement is clicked.

6. The method of claim 1, wherein the step of determining the probability is performed
before or within a lifetime of the advertisement campaign.

7. The method of claim 1 further comprising:
updating of the probability of the target event, wherein both the updating of the probability and the step of training the second term of the objective function are performed essentially immediately.

8. The method of claim 1, wherein the step of training comprises:
optimizing the objective function by adjusting parameters of the machine learning model.

9. The method of claim 8, wherein the step of optimizing comprises a stochastic gradient descent process.

10. The method of claim 1, wherein the generation of the feature vectors further comprises profile data of a user who incurs at least one of the prerequisite event or the target event.

11. The method of claim 1,
wherein the first term of the objective function is proportional to sum of a first product over the instances, the first product comprising a numerical value derived from the unlabeled instances for which only the prerequisite event has occurred and a first factor related to the probability that the target event does not occur, and
wherein the second term of the objective function is proportional to a sum of a second product over the instances, the second product comprising a numerical value derived from the subset of instances and a second factor related to the probability that the target event occurs relative to the probability that the target event does not occur.

12. The method of claim 1, wherein the step of calculating optimizes the objective function.

13. The method of claim 1, wherein the prerequisite event comprises an impression event and a click event and the target event comprises a conversion event.

14. A non-transitory computer-readable storage medium comprising one or more computer-readable instructions that, when executed by at least one processor of a computing device, causes the computing device to:
receive a notification that a prerequisite event has occurred for an instance of an advertisement rendered on the computing device;
assign, in response to the prerequisite event, the instance as unlabeled;
generate a set of feature vectors from the unlabeled instance;
train, using the set of feature vectors, a machine learning model comprising a logarithmic loss objective function and a first term;
receive a notification indicating a target event has occurred subsequent to the prerequisite event for the instance;
re-assign, in response to the target event, the instance as positive;
update the set of feature vectors associated with the positive instance;
generate, by the machine learning model, a probability of a target event occurring after a prerequisite event for a new advertisement, and
determine, using the probability of the target event, a cost for the new advertisement.

15. The non-transitory computer-readable storage medium of claim 14, wherein the prerequisite event comprises a click event and the target event is a conversion event and
the cost is a cost-per-conversion.

16. The non-transitory computer-readable storage medium of claim 14, wherein the prerequisite event comprises an impression event and the target event comprises at least one of a click event or a conversion event.

17. The non-transitory computer-readable storage medium of claim 14, wherein the prerequisite event comprises an impression event and a click event and the target event comprises a conversion event.

18. A computing system, the system comprising:
a memory for storing parameters of a machine learning model to determine a probability of a target event occurring subsequent to a prerequisite event for an instance of an advertisement;
a labeling module, stored in the memory, configured to label the instance as unlabeled, in response to the prerequisite event when the instance is rendered on a user device or on a computing device;
the labeling module, stored in the memory, further configured to re-assign the unlabeled instance as positive in response to the target event;
a feature extraction module, stored in the memory, configured to generate feature vectors of the unlabeled instance or of the positive instance;
a training module, stored in memory, configured to train parameters of the machine learning model, by minimizing a logarithmic loss objective function comprising a first and a second term, the first term optimized for feature vectors derived from unlabeled instances with no target event and the second term is optimized for feature vectors derived from positive instances;
a prediction module, stored in the memory, configured to provide a probability on whether a target event will occur for a new advertisement, by providing feature vectors of the new advertisement to the machine learning model;
a pricing module, stored in the memory, configured to provide a cost for distributing the new advertisement based on the probability of a target event; and
at least one physical processor that executes the labelling module, the feature extraction module, the training module, the prediction module, and the pricing module.

19. The computing system of claim 18, wherein the prerequisite event comprises an impression event, wherein the target event comprises a click event, and wherein the cost comprises a cost-per-click.

20. The computing system of claim 18, wherein the prerequisite event comprises at least one of an impression event or a click event, wherein the target event comprises a conversion event, and wherein the cost comprises a cost-per-conversion.

\* \* \* \* \*